Figure 1:
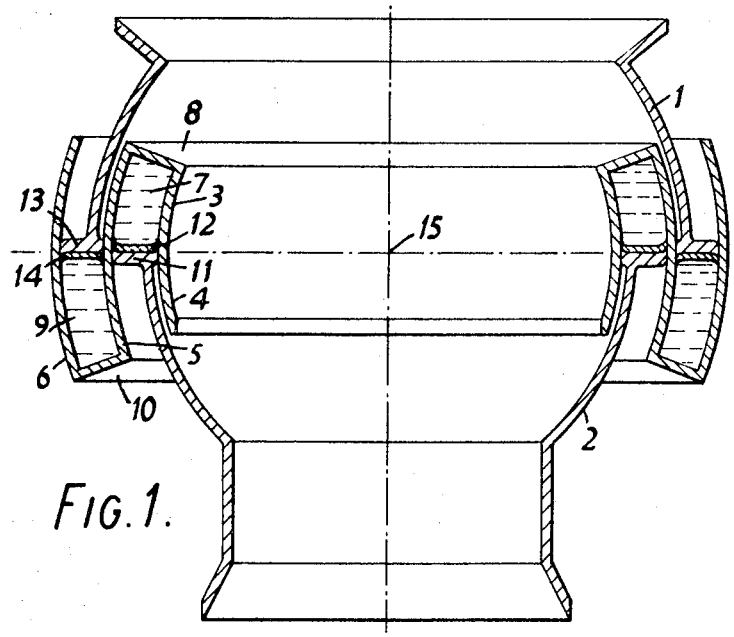

United States Patent [19]
Peress

[11] 3,754,779
[45] Aug. 28, 1973

[54] FLEXIBLE JOINTS

[76] Inventor: Joseph S. Peress, Moorcroft, Lammas Ln., Esher Surrey, England

[22] Filed: Aug. 30, 1971

[21] Appl. No.: 175,978

[30] Foreign Application Priority Data
Sept. 4, 1970 Great Britain................... 42,619/70
Nov. 25, 1970 Great Britain................... 56,174/70

[52] U.S. Cl...................... 285/11, 2/2.1 R, 285/166, 285/263, 285/331
[51] Int. Cl............................................. F16l 27/00
[58] Field of Search....................... 285/10, 11, 263, 285/261, 264, 166, 331; 2/2.1 R, 2.1 A

[56] References Cited
UNITED STATES PATENTS

| | | | |
|---|---|---|---|
| 1,888,026 | 11/1932 | Chapman............................. | 285/11 |
| 586,176 | 7/1897 | Gorter................................ | 285/263 |
| 1,383,322 | 7/1921 | Marr.............................. | 285/264 X |
| 1,947,657 | 2/1934 | Peress................................ | 285/11 |
| 1,368,786 | 2/1921 | Graff.............................. | 285/263 X |
| 1,414,174 | 4/1922 | Campos............................ | 285/10 X |
| 1,402,645 | 1/1922 | Peress................................. | 285/10 |
| 1,146,781 | 7/1915 | Bowdoin............................ | 2/2.1 R |
| 880,813 | 3/1908 | Nailler............................ | 285/261 X |

FOREIGN PATENTS OR APPLICATIONS
94,537   1/1897   Germany........................... 285/263

Primary Examiner—Thomas F. Callaghan
Attorney—Donald M. Wight et al.

[57] ABSTRACT

A flexible joint for use with apparatus subjected to an internal/external pressure differential for example, submersible diving apparatus. The joint comprises an annular female member into which a relatively angularly movable annular male member can extend and which members are coupled together by an annular connecting member. The couplings between the female member and the connecting member, and between the connecting member and the male member each include an annular piston located within a part-spherical closed annular cylinder filled with fluid.

22 Claims, 3 Drawing Figures

Patented Aug. 28, 1973

3,754,779

2 Sheets-Sheet 1

Patented Aug. 28, 1973 3,754,779

2 Sheets-Sheet 2

FLEXIBLE JOINTS

This invention relates to a flexible joint for use with apparatus subjected to an internal/external pressure differential and to apparatus incorporating such joints. Thus, the joint can be used in connection with submersible diving apparatus for example, an armoured deep diving suit or for any other purpose such as a pipeline in which such a joint or apparatus is required.

In the Applicant's British Patent No. 400,386 a joint for use in such apparatus is described in which sealing is provided by arranging for one part of the joint to move in a chamber carried in the other part of the joint and which is filled with fluid. Whilst diving suits incorporating such joints are manoeuvrable they suffered from a lack of angular range of motion, this being limited by the diameter of the arm or leg sleeves. At the extreme end of angular motion the end of one member came into contact with the other and it was only possible to increase the movement by decreasing the diameter of the sleeves so as to provide a greater angle from the centre line of the joint to the top and bottom of the members. Unfortunately this cannot be done due to the limiting minimum inner diameter which is necessary in order to accommodate the diver.

According to the present invention a flexible joint for use with apparatus subjected to an internal/external pressure differential comprises an annular female member into which a relatively angularly movable annular male member can extend, and which are connected together by an annular connecting member, the couplings between the female member and the connecting member and between the connecting member and the male member each including an annular piston located within a part-spherical closed annular cylinder filled with fluid.

Thus, when the joint is used to provide angular movement between the members one side of the joint is contracted, the annular pistons extending to their maximum extend into the cylinders so that a considerable degree of angular movement can be accommodated.

In one preferred arrangement both cylinders are provided on the connecting member and they can be arranged to open in opposite directions a partition between them forming the containing surfaces of the two cylinders.

With this construction the ends of the pistons carried by the male and female members are preferably arranged in approximately the same plane when the joint is in a position where the male and female members and connecting member are substantially coaxial.

In order to provide equal movement about the centre of the joint the male, female and connecting members may be concentric and the annular connecting member may be arranged to extend for an approximately equal angular distance about the axis of the joint on each side of the mutual diametral plane of the ends of the pistons.

Preferably the male and/or female members are made in one piece.

In alternative constructions the connecting member could carry both the pistons or it could carry the pistons for one of the couplings and the cylinders for the other.

Thus, the female member may have a cylinder which co-operates with the piston on the connecting member, and the male member a piston which co-operates with the cylinder on the connecting member.

Preferably the annular cylinder of the connecting member extends substantially axially into the annular piston thereof so that a "telescopic" effect is achieved at one side of the joint when angular movement takes place.

Preferably the part spherical cylinders have a common spherical centre and with this construction the head of both pistons may be radial to the common spherical centre.

Again with this form of construction the piston of the connecting member is preferably arranged to extend for approximately equal angular distances about the spherical centre.

If desired the centres of the part-spherical cylinders may be spaced apart.

In one preferred embodiment the walls of one or more of the cylinders may carry sealing means which engage and seal axially extending walls provided on the annular piston which moves therein.

The sealing members may conveniently be in the form of resilient sealing rings.

In order to assist assembly one or more of the cylinders may have detachable wall portions which can be removed and with this arrangement the detachable wall portions may form part of the inner wall of the cylinder and be in the form of a collar which carries sealing means for the piston.

Sealing arrangements of this kind are set forth in the Applicant's co-pending U.S. Pat. application Ser. 176,191, filed on even date herewith.

In an alternative arrangement one or more of the annular pistons carries sealing means which engage the walls of the cylinder in which it moves.

The joint is particularly useful for use with suits subjected to an internal/external pressure differential such as an armoured diving suit and the invention therefore includes a protective suit or apparatus incorporating such a joint.

Figure 3:
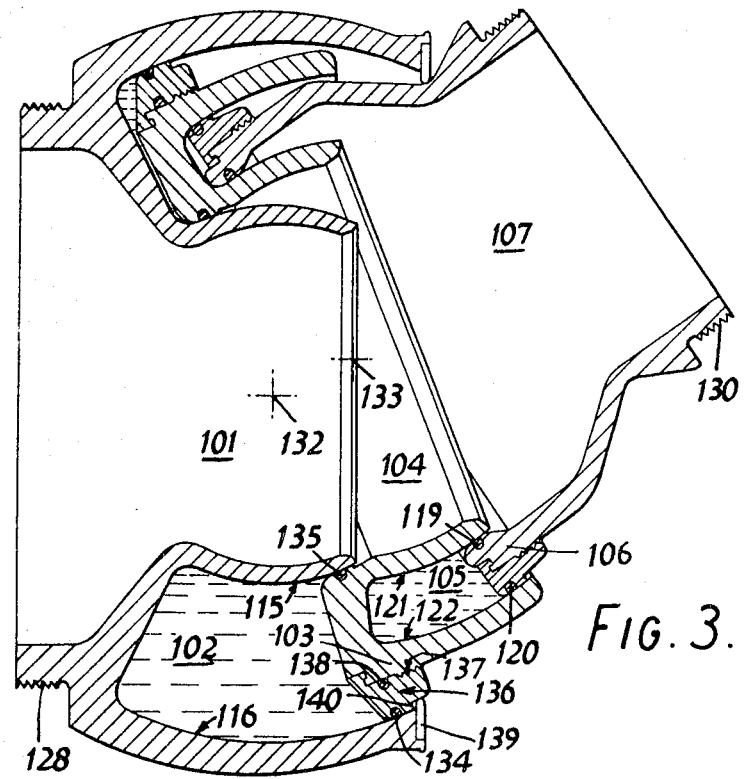
Figure 2:
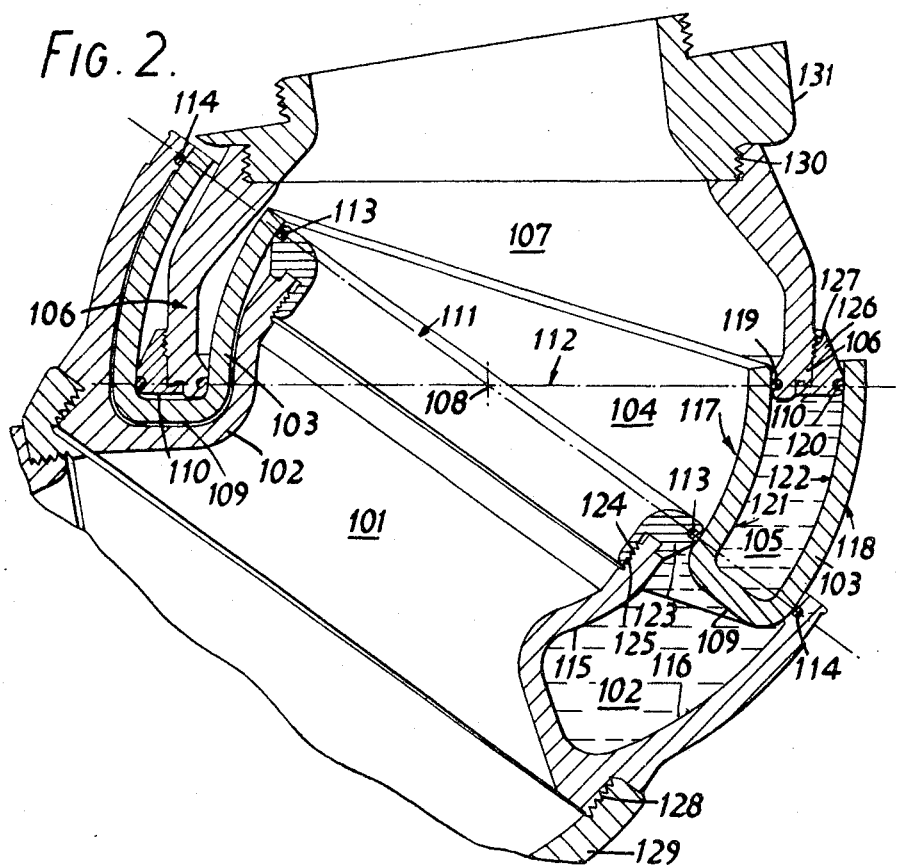

The invention may be performed in many ways, and three embodiments will now be described by way of example and with reference to the accompanying drawings in which:

FIG. 1 is a diagrammatic cross-sectional side elevation of a flexible joint according to the invention, FIG. 2 is a cross-sectional side elevation of another joint incorporating the invention, and forming the elbow joint of an armoured diving suit, and FIG. 3 is a cross-sectional side elevation of an alternative construction.

In the first arrangements to be described and as shown in FIG. 1. of the drawings the flexible joint is intended for use as a knee joint in a submersible armoured diving suit and comprises two annular partspherical members, the upper member, referred to herein as the female member 1, being connected to the upper part of the leg of the suit (not shown) and the lower member, referred to herein as the male member 2, being connected to the lower part of the leg of the suit (not shown). The two part spherical members 1 and 2 are both coupled to an annular connecting member 3 which consists of three co-axial walls 4, 5 and 6, a partspherical annular cylinder 7 being formed between the inner wall 4 and middle wall 5 by sealing off their upper ends by an annular end plate 8 and a similar partspherical annular chamber 9 being formed between the middle wall 5 and the outer wall 6 by a similar end plate 10 extending between them at their lower ends. The diameter of the inner wall 4 is slightly less than the diameter of the male member 2 which extends into the cylinder 7 formed between the walls. The upper end of the male member 2 carries an annular piston 11 provided with a suitable sealing washer 12 which seals the open end of the cylinder 7 and the closed portion of the cylinder above the piston 11 is filled by any suitable means with a non-compressible fluid. Thus, a sealed joint is provided by the coupling formed between the male member 2 and the connecting member 3 and the male member 2 can move as a universal joint.

A similar sealed joint is provided between the female member 1 and the connecting member 3 by the provision of a second annular piston 13 and sealing washer 14 provided on the end of the female member 1 which extends into the outer cylinder 9 on the connecting member 3, the lower portion of this chamber also being filled with a non-compressible fluid.

As will be seen from FIG. 1 the ends of the pistons 11 and 13 are arranged in approximately the same diametral plane extending across the joint when the joint is in a position where the male and female members and the connecting member are substantially co-axial, the members are concentric and the connecting member 3 is arranged to extend for approximately equal angular distances about the axis of the joint on each side of this mutual plane. The connecting member 3 can therefore "float" between the male and female members 1 and 2 and the maximum relative angular displacement between them will be equal to twice the angle contained between the upper and lower ends of the cylinders in the annular member 3.

In previously known spherical joints of this kind the maximum angle of displacement has been equal to only the angle contained within the length of the cylinder. Thus, the present joint should enable a diver to kneel on the bottom or climb a ladder movements which need 80° to 100° bending motion and which are not possible with previous arrangements.

The construction of the various members could be based upon the construction in the Applicant's British Patent No. 400,386, for example, the pistons could be made as separate members which could be released from the male and female members and suitable flanges can be provided for connecting the joint to the suit. This form of construction is, however, not very satisfactory and a better construction is obtained if the male and female members are each made in one piece as shown in FIG. 1, for example by casting or forging, or by metal fabrication.

In an alternative construction the sealing arrangements described in the Applicant's co-pending U.S. Pat. application No. 176,191 can be used in which the sealing means between the movable pistons and the cylinders is carried on the walls of the cylinders rather than on the pistons as described above and as shown in FIG. 1.

An elbow joint for a submersible armoured diving suit embodying the invention is shown in FIG. 2 and comprises a female annular member 101 in which is a closed part-spherical annular cylinder 102 which is filled with a suitable non-compressible fluid, such as oil or glycerine, by means of an opening (not shown) which is subsequently closed and sealed. Movably mouted in the cylinder 102 is a part-spherical annular piston 103 forming part of an annular connecting member which is indicated by reference numberal 104. This member 104 also has a closed part-spherical annular cylinder 105 which extends axially into the piston 103 and which is also filled with a non-compressible fluid such as oil or glycerine by means of an opening (not shown) which is subsequently closed and sealed. Movably housed in the cylinder 105 is a second annular piston 106 which forms part of an annular male member 107.

The annular cylinders 102, 105 and pistons 103, 106 have a common spherical centre indicated by reference numeral 108, the heads 109 and 110 respectively of the pistons 103 and 106 being radial to this common spherical centre and the major portion of the length of the cylinder 102 extending to one side of the plane indicated by a broken line 111 which passes diametrically through the centre 108. The piston 103 extends for approximately equal angular distances about the spherical centre and the head 110 of the second piston 106 is approximately in a plane indicated by broken line 112 passing diametrically through the centre 108.

In order to prevent distortion and provide rigidity in the construction the connecting member 104 is preferably machined from one piece and in order to provide sealing member 101 carries resilient sealing rings 113 and 114 on the walls 115 and 116 of the cylinder 102, the sealing rings 113 and 114 engaging and sealing the inner and outer axially extending walls 117 and 118 of the piston 103, these walls being parallel and part-spherical.

The piston 106 also carries resilient sealing rings 119, 120 which engage the walls 121 and 122 of the cylinder 105 in the connecting member 104.

In order to assist assembly the inner wall 115 of the cylinder 102 is provided with a removable portion in the form of a collar 123 which can be split to facilitate assembly and which carries the resilient sealing member 113 and which is screw threaded at 124 to engage and co-operate with an appropriate screw threaded portion 125 on the first member 101. Similarly the piston 106 is also provided with a detachable portion in the form of a ring 126 which can also be split and which is screw threaded at 127 on to a co-operating screw thread on the annular member 107. In this case the ring 126 carries the resilient sealing ring 120.

In order to assemble the joint the pistons are first inserted into their appropriate cylinders and the ring 126 and collar 123 are subsequently screwed into place. The screw assembly enables the construction to be watertight and the sealing rings ensure that there is no loss of fluid from the cylinders.

The member 101 is connected by means of a screw thread 128 to an annular part 129 which provides the forepart of the arm of the diving suit and the annular part 107 is connected by means of a screw thread 130 to an annular part 31 which acts as the upper part of the arm of the suit and is connected to a shoulder joint.

In previously known spherical joints of this kind the maximum angle of displacement has been equal to only the angles contained in the length of the fluid chamber. The joint of the present kind when used as an elbow joint should enable the diver to have sufficient elbow movement to almost reach his chest with his hand.

In the third embodiment to be described and as shown in FIG. 3 the same reference numerals as are used in FIG. 2 will be used to indicate similar parts. Thus, the elbow joint again comprises an annular member 101 which has a part-spherical annular cylinder 102 in which a piston 103 carried on a connecting member 104 can move. The connecting member 104 again has a part-spherical annular cylinder 105 in which is a movable piston 106 carried on an annular male member 107. Again, the member 107 is provided with a screw thread 130 for connection to another part of the suit and the member 101 carries a screw thread 128 for a similar purpose.

In this construction, however, the spherical centre of the cylinger 102 is indicated by reference numeral 132 and the part-spherical annular cylinder 102 extends for approximately equal angular distances about its spherical centre. The spherical centre of the second cylinder 105 is indicated by reference numeral 133 and it is displaced axially and radially from the centre 132. With this arrangement therefore the part-spherical annular cylinders are not concentric so that the joint does not turn about a fixed centre which had advantages in certain constructions.

In this second construction sealing rings 134 and 135 are carried by the piston 103 and move on the walls 115 and 116 of the cylinder 102. Thus, in this construction the resilient sealing rings are carried by the piston 103 and not on the cylinder walls themselves. In order to assist assembly the piston 103 is provided with a head ring 136 which can be split and which is screw threaded at 137 onto the piston 103 and carried a sealing ring 138 to ensure that it is liquid tight. The head ring 136 ensures ease of assembly. An abutment ring 139 is provided around the outer end periphery of the member 101 to act as an abutment which engages a flange 140 on the head ring 136 to limit the withdrawal movement of the piston.

Similar advantages to the arrangement shown in FIG. 2 are achieved with this second embodiment.

The term "protective suit or apparatus" is used herein not only to include suits having arms and legs in which the occupant, such as a diver is protected, but also chambers from which movable limbs project or, indeed any kind of protective apparatus for which such a joint is required.

It will be appreciated that such a joint could be incorporated in a suit for working in pressurised or vacuum atmospheres such as those encountered in space activities or be employed wherever there is a requirement for a hollow flexible joint which is subjected to an internal-/external pressure differential, for example, a pipeline.

What I claim is:

1. A flexible joint for use with apparatus subject to both constant angular displacement and an internal/external pressure differential, said joint comprising an annular female member, an annular male member within said annular female member, and an annular connecting member located between said male member and said female member and forming a connection between said male member and said female member, said connection including first and second coupling means, said first coupling means comprising a first part spherical annular cylinder generally U-shaped in radial section and having annular open and closed ends, a first part spherical annular piston positioned within said first cylinder for relative angular movement, a first sealing liquid in said first cylinder between said first piston and said first cylinder closed end, cooperating first sealing means on said first piston and said first cylinder sealing said first cylinder against escape of said first sealing liquid, and the initial relative positions of said first piston and said first cylinder and the depth of said first cylinder being one wherein when said first piston is moved to an angular position relative to said first cylinder said first piston engages said first cylinder closed end prior to a diametrical portion of said first piston exiting from said first cylinder thereby maintaining said first piston within said first cylinder and the seal between said first piston and said first cylinder; and said second coupling means comprising a second part spherical annular cylinder generally U-shaped in radial section and having annular open and closed ends, a second part spherical annular piston positioned within said second cylinder for relative angular movement, a second sealing liquid in said second cylinder between said second piston and said second cylinder closed end, cooperating second sealing means on said second piston and said second cylinder sealing said second cylinder against escape of said second sealing liquid, and the initial relative positions of said second piston and said second cylinder and the depth of said second cylinder being one wherein when said second piston is moved to an angular position relative to said second cylinder said second piston engages said second cylinder closed end prior to a diametrical portion of said second piston exiting from said second cylinder thereby maintaining said second piston within said second cylinder and the seal between said second piston and said second cylinder.

2. A flexible joint as claimed in claim 1 in which both cylinders are provided on the connecting member.

3. A flexible joint as claimed in claim 2 in which the cylinders open in opposite directions there being a partition between them forming the closed ends of the two cylinders.

4. A flexible joint as claimed in claim 3 in which said pistons have head ends arranged in approximately the same plane when the joint is in a position where the male and female members and the connecting member are substantially co-axial.

5. A flexible joint as claimed in claim 4 in which the male, female, and connecting members are concentric and the connecting member extends for an approximately equal angular distance about the axis of the joint on each side of the mutual diametral plane of the ends of the pistons.

6. A flexible joint as claimed in claim 1 in which at least one of the male and female members is made in one piece.

7. A joint as claimed in claim 1 in which the connecting member carries the piston of one of said coupling means and the cylinder of the other of said coupling means.

8. A joint as claimed in claim 1 in which said second cylinder is carried by said female member and co-operates with said second piston which is carried by the connecting member, and said first piston is carried by said male member and co-operates with said first cylinder which is carried by the connecting member.

9. A joint as claimed in claim 8 in which the part-spherical cylinders have a common spherical centre.

10. A joint as claimed in claim 9 in which both pistons have heads disposed radial to the common spherical centre.

11. A joint as claimed in claim 10 in which the head of said first piston is approximately in a plane passing diametrically through the common spherical centre.

12. A joint as claimed in claim 7 in which the centres of the part-spherical cylinders are spaced apart.

13. A joint as claimed in claim 1 in which at least one of said sealing means includes the respective one of said cylinders having sealing elements which engage axially extending walls on the respective piston disposed therein.

14. A joint as claimed in claim 13 in which the sealing elements are in the form of resilient sealing rings.

15. A joint as claimed in claim 1 in which at least one of the cylinders has a detachable wall portion which can be removed to assist assembly.

16. A joint as claimed in claim 15 in which the detachable wall portion forms part of the inner wall of the cylinder.

17. A joint as claimed in claim 16 in which the detachable wall portion is in the form of a collar and carries the respective sealing means for engaging the respective piston.

18. A joint as claimed in claim 1 in which at least one of said sealing means includes the respective one of said pistons having sealing means which engage walls of the respective cylinder in which it is disposed.

19. A joint as claimed in claim 1 in which the part-spherical cylinders have a common spherical centre.

20. A joint as claimed in claim 19 in which both pistons have heads disposed radial to the common spherical centre.

21. A joint as claimed in claim 20 in which said first piston has a head disposed approximately in a plane passing diametrically through the common spherical centre.

22. The joint of claim 1 wherein said joint is particularly adapted for forming a flexible joint of a limb of a personal suit constructed to protect an individual against an internal/external pressure differential.

* * * * *